(12) United States Patent
Hellström et al.

(10) Patent No.: US 6,709,204 B2
(45) Date of Patent: Mar. 23, 2004

(54) ROTATABLE CUTTING TOOL

(75) Inventors: Lars Hellström, Årsunda (SE); Göran Pantzar, Årsunda (SE)

(73) Assignee: Sandvik Aktiebolag, Sandviken (SE)

( * ) Notice: Subject to any disclaimer, the term of this patent is extended or adjusted under 35 U.S.C. 154(b) by 70 days.

(21) Appl. No.: 10/214,709

(22) Filed: Aug. 9, 2002

(65) Prior Publication Data

US 2003/0031518 A1 Feb. 13, 2003

(30) Foreign Application Priority Data

Aug. 9, 2001 (SE) .............................................. 0102628

(51) Int. Cl.[7] .......................... B23B 29/00; B23B 15/28
(52) U.S. Cl. ...................................... 407/102; 407/104
(58) Field of Search ................................ 407/102, 103, 407/104, 97, 87, 48

(56) References Cited

U.S. PATENT DOCUMENTS

| | | | | |
|---|---|---|---|---|
| 4,533,283 A | * | 8/1985 | Satran et al. | 407/111 |
| 5,542,793 A | * | 8/1996 | Deiss et al. | 407/35 |
| 6,190,095 B1 | * | 2/2001 | Schmidt | 407/104 |
| 6,579,042 B1 | * | 6/2003 | Shiraiwa | 407/35 |

* cited by examiner

*Primary Examiner*—Willmon Fridie, Jr.
(74) *Attorney, Agent, or Firm*—Burns, Doane, Swecker & Mathis, LLP

(57) ABSTRACT

A rotatable tool includes a rotatable body defining an axis of rotation. The body forms a seat configured to receive a cutting insert. The seat includes a bottom surface and a radial support upstanding therefrom. The bottom surface includes a screw-receiving hole which intersects the bottom surface to form a port therein. The screw-receiving hole includes a female screw-threaded portion spaced from the port by a non-threaded portion. A fastening screw secures the cutting insert to the body. The screw includes a shaft having at one end thereof a male screw thread connectable to the female screw threaded portion, and at an opposite end thereof a head. The shaft also includes a non-threaded portion disposed between the male screw thread and the head and sized to be received in the non-threaded portion of the screw-receiving hole. The port and the non-threaded portion of the screw-receiving hole have a non-circular shape that is elongated generally in a radial direction relative to accommodate bending deflection of the non-threaded portion of the screw when the screw is tightened.

14 Claims, 3 Drawing Sheets

ROTATABLE CUTTING TOOL

This application claims priority under 35 U.S.C. §§ 119 and/or 365 to Patent Application Serial No. 0102582-2 filed in Sweden on Aug. 9, 2001, the entire content of which is incorporated herein by reference.

TECHNICAL FIELD OF THE INVENTION

This invention relates to a rotatable cutting tool of the type that comprises a basic body, rotatable around a geometric axis, and a cutting insert that is mountable in a seat formed in the basic body, which seat has two supports, viz. a bottom surface against which a bottom side of the cutting insert is pressable and a radial support against which a side surface of the cutting insert is pressable in order to fix the cutting insert in respect to radial and/or tangential forces. Fixing of the cutting insert in respect of axial forces is guaranteed by a screw insertable in a through hole in the cutting insert, which screw has a head countersinkable in the cutting insert, and a shaft that includes on the one hand a lower male thread for engagement with a female thread in a lower part of a second hole formed in the holder, which opens in a port in the bottom surface of the seat, and on the other hand an upper, rotationally symmetrical, non-threaded portion that is locatable in an upper bore that extends between the female thread and the port of the second hole.

PRIOR ART

A cutting tool of the above generally mentioned kind is previously known from Deiss et al. U.S. Pat. No. 5,542,793. Characteristic of this tool, which is exemplified in the form of a cylindrical cutter, is that the seats for the cutting inserts lack particular axial supports. The axial forces, which act on the individual cutting insert, are resisted (absorbed) by the screw that has the purpose of clamping the cutting insert in the seat. The upper portion of the shaft of the screw is cylindrical and manufactured having an outer diameter which is slightly smaller than the inner diameter of a likewise cylindrical bore of the holder in which the upper shaft portion is received in order to fix the individual cutting insert in a position that is as exactly geometrically defined as possible on tightening the screw. In this way, the upper cylindrical portion of the screw shaft is provided with a very tight fit in relation to the interior of the bore. This narrow fit is present all the way from the port (or mouth) of the bore to the place where the bore transforms into the female thread. Upwards from the port, the cylindrical shaft portion of the screw extends a short distance up to a place where the same transforms into a conical surface formed on the head, which is tightened against a conical surface in the through hole in the cutting insert. Between this conical surface and the bottom side of the cutting insert, the through-hole includes a lower hole portion which has a considerably greater inner diameter than the outer diameter of the cylindrical shaft portion. The center axis for the second hole formed in the basic body, i.e., the hole that includes the female thread together with the cylindrical bore, and the center axis for the through-hole in the cutting insert, are somewhat displaced in relation to each other in the radial direction, more precisely with the purpose of enabling the upper part of the screw to bend and forcefully press a side surface of the cutting insert against a radial support formed in the basic body, on tightening of the screw.

A disadvantage of the problem-solving presented in U.S. Pat. No. 5,542,793 is however on one hand precisely the fact that the shaft portion of the screw has a narrow fit all the way along the cylindrical bore in the hole in the basic body, and on the other hand the fact that the protruding shaft portion that extends between the head of the screw and the bottom surface of the seat is comparatively short. Therefore, the distance along which the upper part of the screw may bend, and which is determined by the distance between the head and the bottom surface of the seat becomes very limited. This may in practice have harmful consequences, e.g. in such a way that the upper part of the screw is cracked or damaged in another way on tightening. Furthermore, the smooth surface of the bore may be damaged and deformed, above all in connection to the port, something which in turn may result in the ability of the screw to axially fix the cutting insert in an exact way being lost.

Because of varying production tolerances, the actual contact point between the shaft of the screw and said bore may furthermore vary in an uncontrolled way. At one time, the contact point or surface may be located in the immediate vicinity of the port and at other times, it may be located deeper down in the hole.

AIMS AND FEATURES OF THE INVENTION

The present invention aims at obviating the above-mentioned disadvantages of the cutting tool according to U.S. Pat. No. 5,542,793 and at providing an improved cutting tool. Thus, a primary aim of the invention is to provide a cutting tool having at least one replaceable cutting insert that may be fixed in an exact position by means of a radial support and a fixing screw, i.e., without particular axial supports, and to, in relation hereby, guarantee on the one hand that the contact point or the contact place between the screw and the hole in the basic body is always located in a repeatable and well-defined way, and on the other hand that neither the screw nor the receiving hole is damaged in connection with mounting and dismounting, respectively, of the cutting insert. An additional aim is to provide a cutting tool, the cutting insert of which is pressed and retained against the radial support in a reliable way.

According to the invention, at least the primary aim is attained by a rotatable tool which comprises a rotatable basic body defining an axis of rotation. The basic body forms a seat configured to receive a cutting insert. The seat has a bottom surface and a radial support upstanding from the bottom surface. The radial support is arranged to resist forces acting in a radial direction with respect to the axis of rotation. The bottom surface includes a screw-receiving hole which intersects the bottom surface to form a port. The screw-receiving hole includes a female screw-threaded portion spaced form the port by a non-threaded portion. A fastening screw is provided for securing the cutting insert to the basic body. The screw includes a shaft having at one end thereof a male screw thread connectable to the female screw-threaded portion, and at an opposite end thereof a head. The shaft further includes a non-threaded portion disposed between the male screw thread and the head and sized to be received in the non-threaded portion of the screw-receiving hole. The port and the non-threaded portion of the screw-receiving hole have a non-circular shape that is elongated generally in the radial direction to accommodate bending deflection of the non-threaded portion of the screw in that generally radial direction.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
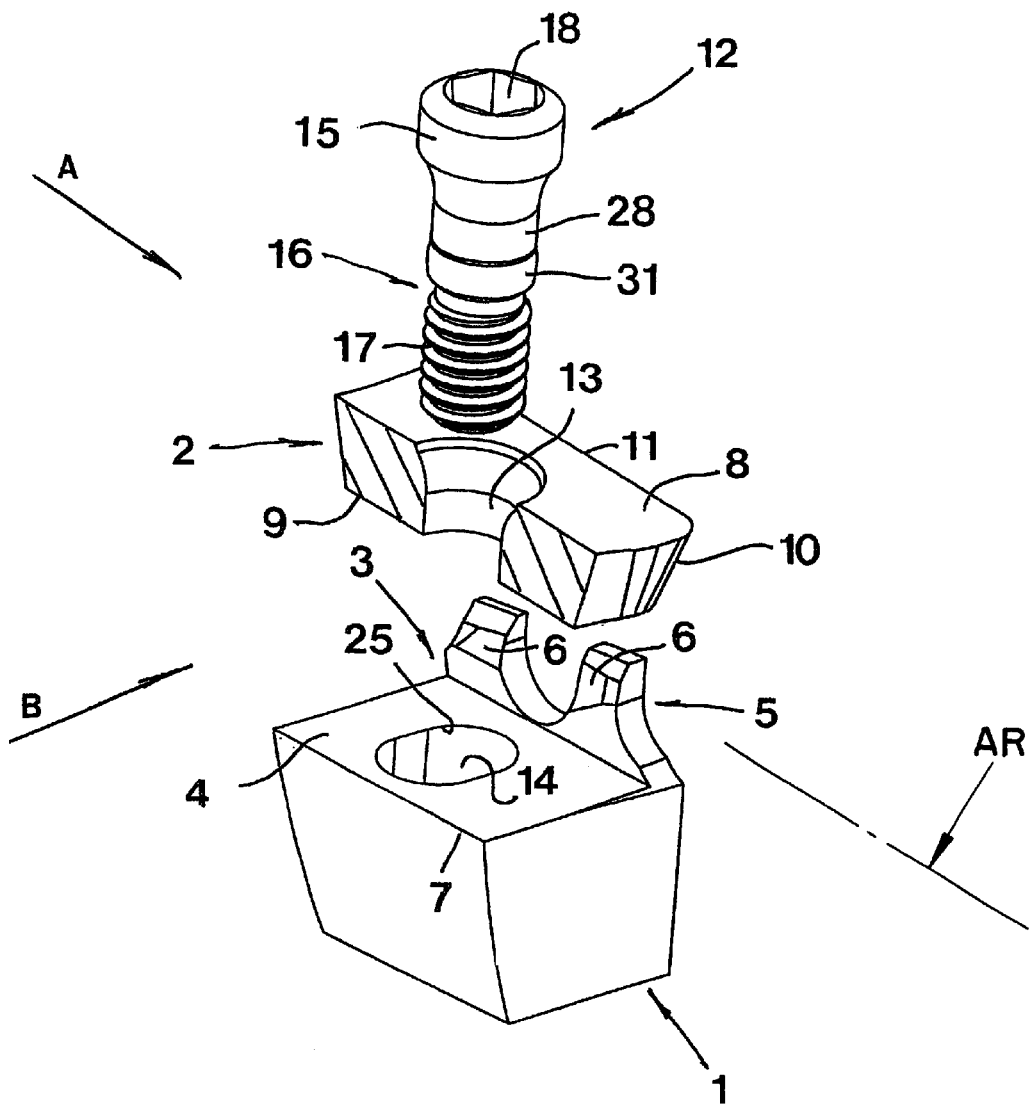
FIG. 1 is an exploded view in perspective which fragmentary shows a cutting insert and a portion of a rotatable basic body adjacent to a seat for the cutting insert.

The rotatable cutting tool according to the invention includes a rotatable basic body generally designated 1 and at least one cutting insert designated 2. The basic body may comprise a milling head of the type disclosed in U.S. Pat. No. 5,542,793, which defines an axis of rotation AR, and which contains a number of cutting inserts. The disclosure of that patent, insofar as describing an arrangement of inserts, is incorporated by reference herein. Each cutting insert 2 is mountable in a respective seat 3 formed in the basic body 1, the seat having two supports, viz. a bottom surface 4 and a radial support, in its entirety designated by numeral 5, which includes two spaced-apart contact surfaces 6 upstanding from an edge of the bottom surface. The basic body 1, only a minor portion of which is shown fragmentarily in FIG. 1, is rotatable around the geometric axis AR that is oriented parallel to a front edge 7 of the bottom surface 4 of the seat. The cutting insert 2, which is of an indexable type, has in this case a top side 8, a bottom side 9, as well as four side surfaces 10, two of which form flank surfaces in connection with major cutting edges 11. When the cutting insert 2 is mounted in the seat 3, the bottom side 9 of the cutting insert is pressed against the bottom surface 4 of the seat and a side surface 10 against the two spaced-apart support surfaces 6 of the radial support 5.

During operation of the tool, the cutting insert 2 is exposed to, on the one hand, axial forces in the direction of the arrow A, and on the other hand, a combination of radial and tangential forces in the direction of the arrow B. Said radial and tangential forces are absorbed (resisted) by the radial support 5, while the axial forces are absorbed (resisted) by a screw, in its entirety designated by numeral 12, that has the purpose of fixing the cutting insert in the seat. In other words, the seat for the cutting insert is not formed having any particular, cost-demanding axial supports arranged at an angle to the radial support 5.

Figure 2:
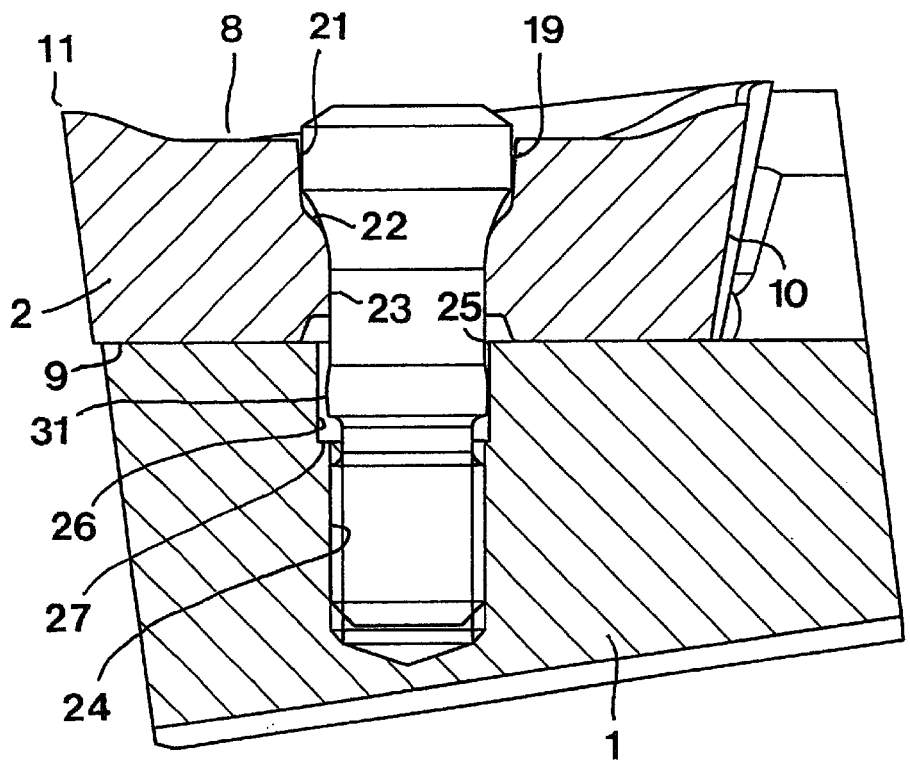
FIG. 2 is an enlarged cross-section which in part schematically illustrates the cutting insert clamped in the seat in the basic body by means of a fixing screw.

For receiving the fixing screw 12, there are provided a through hole 13 arranged in the cutting insert 2 and a screw-receiving hole 14, which is formed in the basic body 1 and forms a port 25 in the bottom surface 4 of the seat. The screw 12 includes a head 15, as well as a shaft, in its entirety designated by numeral 16, having a male thread 17. The head 15, which is formed with a polygonally formed key recess 18, has an upper cylindrical portion 19, as well as a tapering neck portion 20 in the transition between the cylindrical portion 19 and the shaft. The hole 13 is formed having an upper portion 21 which, via a ring-shaped shoulder 22 having a curved, tapering shape, transforms into a lower portion 23, the diameter of which is less than the diameter of the upper portion 21. In FIG. 2, the screw is shown in a tightened state in which the head of the screw is countersunk in the upper portion 21 of the hole 13, whereby the tapering transition surface 20 is pressed against the ring-shaped shoulder 22 in the hole of the cutting insert. Tightening of the screw is carried out by means of the male thread 17 that engages in a corresponding female thread 24 in the lower part of the hole 14.

As far as the shown tool has been described hitherto, the same is in all essentials previously known by U.S. Pat. No. 5,542,793.

As may be seen in FIG. 2, a bore 26 having a non-threaded, preferably smooth, interior extends between the female thread 24 formed at the bottom of the hole 14 and the port 25. More precisely, the bore 26 extends between the port 25 and an endless lower end surface 27 or annular shoulder. Characteristic of the invention is that this upper bore 26 in the hole 14 has a non-circular cross-section-wise elongate shape that is elongated generally in the radial direction B, in order to permit elastic deflection of the outer part of the screw in the area above the male thread 17. Generally, this elongate bore has a larger cross section than the cylindrical or rotationally symmetrical portion 28 of the screw shaft, which extends between the female thread 17 and the head 15, whereby all sides of the bore are spaced from the portion 28 before the screw is completely tightened.

Figure 4:
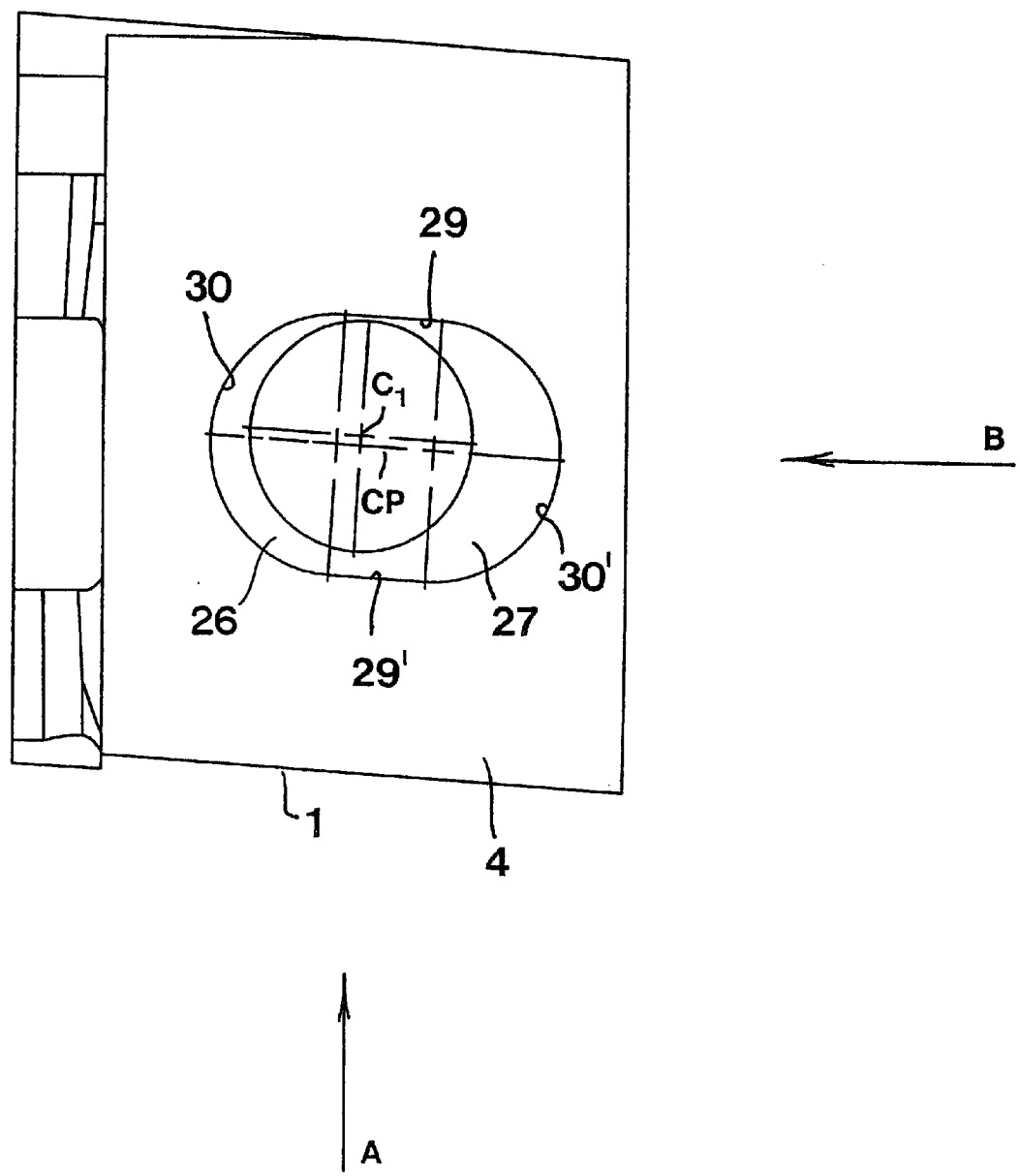
FIG. 4 is a planar view from above the seat and a hole for the fixing screw porting in a bottom surface thereto.

As may be seen in FIG. 4, the bore 26 is defined by two parallel plane surfaces 29, 29', which extend between two concavely semi-cylindrical end surfaces 30, 30'. All of these surfaces extend downwards from the bottom surface 4 of the seat, perpendicularly thereto.

In FIG. 4, the letter $C_1$ designates the center line or center plane for the female thread 24 in the lower part of the hole 14, while a center plane through the elongate bore 26 (situated halfway between the plane wall surfaces 29, 29'), is designated CP. The respective longitudinal axes of the thread 24 and the bore 26 lie in the center planes $C_1$ and CP, respectively. Those two center planes $C_1$ and CP are mutually parallel and extend in the direction of elongation of the upper bore 26. In FIG. 4 it is shown that the center plane C1 of the female thread 24 is eccentrically placed (offset) in relation to the center plane CP of the bore 26, more precisely in a way so that the female thread is situated closer to the wall surface 29 than to the wall surface 29'. The wall surface 29 is the one toward which the screw will be urged in response to the insert being subjected to an axial load, i.e., in direction A.

On the substantially cylindrical upper part of the screw shaft 16, a projection is defined preferably by a thickened girdle portion 31 formed on that portion of the shaft and extending circumferentially therearound. The girdle 31 advantageously may have a convexly curved envelope surface facing the end surface 30, the convex curvature being visible in a plane in which the axis of the screw lies (e.g., visible in FIG. 2). Although this girdle portion is somewhat coarser than the cylindrical portion 28, the girdle portion 31 has a maximum outer diameter that is somewhat smaller than the distance between the plane surfaces 29, 29' of the bore, so that the girdle portion may be inserted into the bore. Between the girdle portion 31 and the male thread 17, there is a narrowed waist portion 32.

Below, there follows a non-limiting example of specific dimensions of the screw 12 and the hole 14, respectively, in the bottom surface of the seat. The total length of a preferred screw is 8.3 mm, whereby the male thread has a length of 2.9 mm and a diameter of 2.50 mm. The cylindrical portion 28 of the screw shaft has a diameter of 2.50 mm, while the girdle portion 31 has a maximum diameter of 2.60 mm. The waist 32 has a diameter of 2.10 mm.

In case of the above-mentioned dimensions of the fixing screw, the elongate bore 26 has a width or minor axis (measured as the distance between the plane side surfaces 29, 29') of 2.625 mm, while the length of the major axis lying in the plane CP amounts to 3.90 mm. The eccentricity between the center plane $C_1$ of the female thread 17 and the center plane CP of the bore 26 may in this connection amount to 0.12 mm.

In this connection, it should also be mentioned that the center of the through hole 13 in the cutting insert 2 is offset in relation to the center of the female thread 24 and the radial support 5 such that the screw, upon being tightened, presses the side surface 10 of the cutting insert against the contact surfaces 6 on the radial support 5, as is known. More precisely, this takes place when the neck portion 20 of the screw is pressed against the shoulder 22 in the hole 13.

Figure 3:
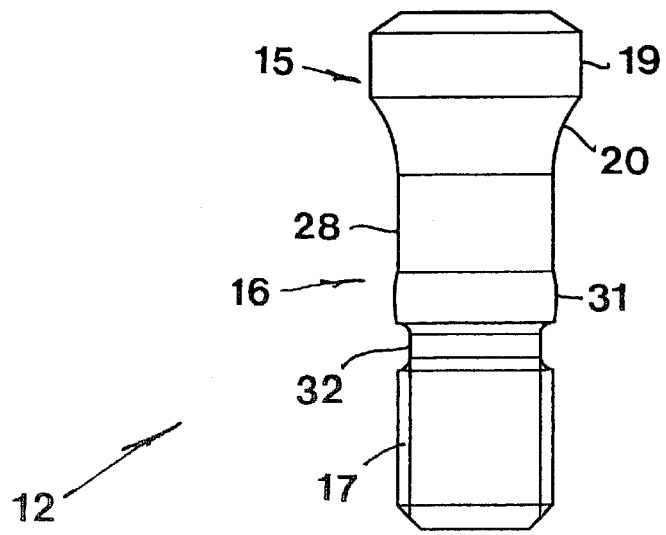
FIG. 3 is a side view of only the proper fixing screw.

Characteristic of the function of the invention is that the elongated nature of the bore 26 in the upper part of the hole 14 allows the upper part of the screw to elastically bend when tightened. More precisely, the part of the screw that extends between the male thread and the contact place between the transition surface 20 and the shoulder 22 may elastically deflect in a free way because this part of the screw lacks contact with surrounding hole surfaces. In the tightened state thereof, the screw furthermore acts as an axial support or axial stop for the cutting insert. Thus, when the cutting insert is exposed to axial forces in the direction of the arrow A (FIG. 3), the girdle portion 31 (which initially is only some hundredths of a millimeter from the side surface 29 of the bore or even in contact therewith) will transmit the axial forces acting on the cutting insert to the basic body via said side wall 29. Thus, the force transmitting contact place between the shaft portion of the screw and the basic body (which theoretically consists of a point contact on the curved envelope surface of the girdle portion) will in a repeatable way always be located along the girdle portion. That is, the portion 28 will not contact the edge of the port 25 and push the girdle portion 31 out of contact with the basic body.

Because this girdle portion is located on a level below the bottom surface of the seat, more precisely in a position near the upper end of the male thread 17, the portion of the screw shaft that bends in connection with tightening has an optimum length. The fact that the contact place between the axial force-absorbing screw and the surrounding, internal surface in the basic body is always located in a predetermined place also means that the designer may master the interaction of forces between the cutting insert, the screw and the seat with a great accuracy.

It should in conclusion be mentioned that the invention is applicable on any rotatable cutting tool, such as milling cutters, drills and the like. Thus, in the example shown, the basic body 1 may be thought to consist of a cutter head, for instance a cylindrical cutter.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A rotatable tool comprising:
a rotatable basic body defining an axis of rotation, the basic body forming a seat configured to receive a cutting insert, the seat having a bottom surface and a radial support upstanding from the bottom surface, the radial support arranged to resist forces acting in a generally radial direction with respect to the axis of rotation, the bottom surface including a screw-receiving hole which intersects the bottom surface to form a port therein, the screw-receiving hole including a female screw-threaded portion spaced from the port by a non-threaded portion of the screw-receiving hole; and a fastening screw for securing the cutting insert to the basic body, the screw including a shaft having at one end thereof a male screw thread connectable to the female screw-threaded portion, and at an opposite end thereof a head, the shaft further including a non-threaded portion disposed between the male screw thread and the head and sized to be received in the non-threaded portion of the screw-receiving hole;

wherein the port and the non-threaded portion of the screw-receiving hole have a non-circular shape that is elongated generally in the radial direction to accommodate bending deflection of the non-threaded portion of the screw in that generally radial direction.

2. The rotatable tool according to claim 1 further including the cutting insert, the cutting insert seated against the bottom surface and the radial support and including a through-hole through which the fastening screw extends, the screw pushing the insert against the bottom surface and the radial support.

3. The rotatable tool according to claim 2 wherein the non-threaded portion of the screw has a cylindrical cross section, and a projection extending generally radially toward the axis of rotation, the projection arranged to contact the non-threaded portion of the screw-receiving hole.

4. The rotatable tool according to claim 3 wherein the projection is defined by a girdle portion extending circumferentially around the non-threaded portion of the screw.

5. The rotatable tool according to claim 4 wherein the girdle portion has an envelope surface which is convexly curved as viewed in a plane in which a center axis of the screw lies.

6. The rotatable tool according to claim 2 wherein the port and the non-threaded portion of the screw-receiving hole are defined by end surfaces extending perpendicularly to the bottom surface, and by end surfaces which interconnect the side surfaces.

7. The rotatable tool according to claim 6 wherein the side surfaces are planar and parallel and extend in a direction of elongation of the non-threaded portion of the screw-receiving hole, the end surfaces being of semi-cylindrical shape.

8. The rotatable tool according to claim 2 wherein the threaded and non-threaded portions of the screw-receiving hole include respective first and second center planes extending in the direction of elongation of the non-threaded portion, the first and second center planes being offset from one another in a generally axial direction with reference to the axis of rotation, wherein the first plane is located closer than the second plane to one of the side surfaces toward which the non-threaded portion of the screw moves when subjected to an axial force.

9. The rotatable tool according to claim 1 wherein the non-threaded portion of the screw has a cylindrical cross section, and has a projection extending generally radially toward the axis of rotation, the projection arranged to contact the non-threaded portion of the screw-receiving hole.

10. The rotatable tool according to claim 9 wherein the projection is defined by a girdle portion extending circumferentially around the non-threaded portion of the screw.

11. The rotatable tool according to claim 10 wherein the girdle portion has an envelope surface which is convexly curved as viewed in a plane in which a center axis of the screw lies.

12. The rotatable tool according to claim 1 wherein the port and the non-threaded portion of the screw-receiving hole are defined by and end surfaces extending perpendicularly to the bottom surface, and by end surfaces which interconnect the side surfaces.

13. The rotatable tool according to claim 12 wherein the side surfaces are planar and parallel and extend in a direction of elongation of the non-threaded portion of the screw-receiving hole, the end surfaces being of semi-cylindrical shape.

14. The rotatable tool according to claim 1 wherein the threaded and non-threaded portions of the screw-receiving hole include respective first and second center planes extending in the direction of elongation of the non-threaded portion, the first and second center planes being offset from one another in a generally axial direction with reference to the axis of rotation.

* * * * *